United States Patent [19]

Kauders et al.

[11] 3,919,109

[45] Nov. 11, 1975

[54] PROCESS FOR PREPARING SUBSTITUTED HALOPHOSPHATE PHOSPHORS

[75] Inventors: Herbert J. Kauders, Euclid; Thomas C. Vincent, Mayfield Heights, both of Ohio

[73] Assignee: General Electric Company, Schenectady, N.Y.

[22] Filed: May 13, 1974

[21] Appl. No.: 469,355

[52] U.S. Cl. .......................... 252/301.6 P
[51] Int. Cl. ............ C09K 11/10; C09K 11/12; C09K 11/16; C09K 11/24; C09K 11/42; C09K 11/44
[58] Field of Search ............ 252/301.6 P, 301.4 P

[56] References Cited
UNITED STATES PATENTS

| | | | |
|---|---|---|---|
| 2,965,786 | 12/1960 | Aia et al. | 252/301.4 P X |
| 3,430,089 | 2/1969 | Sarver et al. | 252/301.6 P X |
| 3,468,812 | 9/1969 | Wanmaker et al. | 252/301.6 P |
| 3,764,555 | 10/1973 | Vincent et al. | 252/301.6 P |

*Primary Examiner*—Jack Cooper
*Attorney, Agent, or Firm*—John F. McDevitt; Lawrence R. Kempton; Frank L. Neuhauser

[57] ABSTRACT

A process of making calcium halophosphate phosphors containing cadmium wherein the cadmium loss due to volatilization is substantially decreased by introducing a cadmium phosphate source into the phosphor material during a second firing of the phosphor material in an inert atmosphere.

2 Claims, No Drawings

PROCESS FOR PREPARING SUBSTITUTED HALOPHOSPHATE PHOSPHORS

BACKGROUND OF THE INVENTION

The present invention relates to a process of manufacturing halophosphate phosphors and particularly to a calcium halophosphate phosphor containing cadmium. The phosphors are used in fluorescent lamps and other devices.

Calcium halophosphate phosphors have the general formula:

$$3Ca_3(PO_4)_2 \cdot CaX:Mn,Sb$$

wherein $x$ is one or more halogens, generally a mixture of fluorine and chlorine. Mn is generally considered to be a primary activator while Sb is considered to be a coactivator or sensitizer, or both. Activators in phosphors act as luminescence centers and actually emit light to provide the light-output of the phosphor. The matrix or crystalline phosphor lattice (calcium halophosphate having an apatite structure in this case) absorbs incident radiant energy such as from a low pressure mercury arc in a fluorescent lamp, and then transmits this energy through the lattice to the activators. At the activators, the energy is converted to light which is then emitted out through the phosphor lattice. Sensitizers serve to enhance absorption of incident radiation and the transfer of the energy therefrom to the activators for the production of useful light. The general method of preparing these phosphors is described in U.S. Pat. No. 3,764,555 — Vincent et al. wherein all ingredients needed in the final phosphor product are blended together in a single batch. In accordance with said general method, the batch of ingredients is first-fired at an elevated temperature for a time sufficient to produce the phosphor and then refired after comminuting and blending the first fired product to produce a phosphor having the desired performance characteristics. The initial batch formula is generally regulated for fluorescent lamp applications to provide a cation ratio of the total calcium, cadmium and manganese ions to the phosphate anion ratio of 9.86/6. On the other hand, a lower cation to anion ratio is disclosed in U.S. Pat. No. 3,430,089 — Sarver et al., wherein the particular cadmium source disclosed was $CdNH_4PO_4 \cdot H_2O$.

In the preparation of halophosphate phosphors, therefore, it is well known to add small amounts of cadmium to such phosphors to increase the efficiency of fluorescent lamps. A variety of cadmium sources have been added in the original batch including cadmium oxide, cadmium ammonium phosphate, cadmium halides, and cadmium carbonate. The serious problem arising with addition of all such cadmium sources in the original batch is significant loss of cadmium due to firing temperatures in the range 1100°–1200°C being employed. Such loss resulted in largely unsuccessful attempts at compensation in the original batch formula accompanied by even larger contamination of the atmosphere with cadmium.

SUMMARY OF THE INVENTION

It has now been found, surprisingly, that a particular class of cadmium source materials; namely, cadmium phosphate compounds can be added to the crushed, first-fired phosphor product and the mixture refired at a lower temperature in an inert atmosphere to provide a final product exhibiting optimum brightness. More particularly, a batch of phosphor ingredients devoid of cadmium content is fired in the conventional manner and the crushed product blended with a cadmium phosphate compound, preferably cadmium pyrophosphate or cadmium ammonium phosphate for refiring in a neutral atmosphere in the temperature range 900°–1150°C. Addition of cadmium oxide type source materials in this manner, including cadmium oxide and cadmium carbonate, has not proven effective since the brightness of the final phosphor product is inferior and some cadmium loss is still experienced. The especially preferred cadmium pyrophosphate additive can be prepared in the customary manner from cadmium ammonium phosphate which in turn can be precipitated from an aqueous solution of cadmium chloride or other soluble cadmium salt containing diammonium phosphate. Cadmium pyrophosphate can also be obtained from cadmium ammonium phosphate by firing this compound in quartz trays for approximately 2 hours at 880°–890°C. The product obtained is a soft wide solid containing approximately 56% cadmium content.

DETAILED DESCRIPTION

The process developed for reducing cadmium emission is detailed hereinafter. This process eliminates a 20–30% weight loss of cadmium experienced in conventional phosphor preparation. Representative examples are furnished below of how the present preparation method can be carried out to include reporting any cadmium losses experienced along with brightness measurements made upon the phosphor products obtained in this manner.

In a preferred embodiment, a cool-white halophosphate phosphor is prepared from a batch of phosphor ingredients having the following molar and weight compositions. Cadmium oxide is omitted from this batch which is maintained in the weight proportions specified below to provide a cation to anion ratio in the phosphor product of 9.86/6.

|         | Moles  | Grams  |
|---------|--------|--------|
| $CaHPO_4$ | 1.0000 | 136.08 |
| $CaCO_3$  | .4623  | 46.27  |
| $CaF_2$   | .1510  | 11.79  |
| $NH_4Cl$  | .0630  | 3.37   |
| $MnCO_3$  | .0300  | 3.45   |
| $Sb_2O_3$ | .0154  | 4.50   |

An appropriate size batch having the foregoing weight proportions was fired in covered crucibles at a temperature of 1100°–1200°C for about 2½ hours and then milled in an attrition mill. After the first firing and milling approximately 1.5% by weight of cadmium pyrophosphate was added and blended into the material. The blend was then second fired in an inert atmosphere of nitrogen in open crucibles in a furnace at a temperature of about 900°–1150°C for about 1½ hours. The gas flowrate was maintained at 5.4 furnace volume exchanges per hour. The cadmium content in the final phosphor product was analytically determined to be 0.84 weight percent, thereby establishing essentially no weight loss of cadmium during the second firing.

Additional phosphors were prepared at various cation to phosphate ion ratios and different cadmium levels in the final halophosphate phosphor products. Phosphor preparations were followed as above otherwise described with the cadmium content being evaluated upon the second fired product. The specific cation to phosphate ion ratios employed were 9.86/6 to 9.90/6 whereas the preferred cadmium pyrophosphate additions to the first fired phosphor product ranged from approximately 0.5 weight percent to approximately 7.1 weight percent with respect to the first fired phosphor product. These cadmium pyrophosphate additions produced a cadmium content in the final phosphor product in the range 0.28–4.0 weight percent. The results are reported in tabular form below along with comparative measurements made upon the plaque brightness. The brightness measurements represent relative percentage brightness compared with a standard calcium halophosphate phosphor having 9.86/6 cation to phosphate ion ratio and a 0.83 weight percent cadmium content in the phosphor when added as CdO in the original batch.

| Cation/Phosphate | $Cd_2P_2O_7$ | Brightness | Actual Cadmium Content | Cadmium Loss |
|---|---|---|---|---|
|  | (%) | (%) | (%) | (%) |
| 9.88/6 | 1.5 | 96.3 | .83 | 0.7 |
| 9.90/6 | 1.5 | 93.4 | .83 | 1.4 |
| 9.86/6 | 0.5 | 100.9 | .28 | none |
|  | 1.8 | 100.8 | 1.1 | none |
|  | 3.6 | 100.3 | 2.3 | none |
|  | 5.3 | 99.0 | 3.0 | none |
|  | 7.1 | 98.8 | 3.8 | none |

It can be noted from the above results that a 9.86/6 cation to phosphate ion ratio is preferred since it permits higher cadmium additions without significant loss to improve the fluorescent lamp performance.

It will be apparent from the foregoing description that while specific examples have been given of the phosphors and method of preparation, that various modifications can be made within the spirit and scope of the present invention. For example, it is contemplated to practice the present invention with calcium halophosphate phosphors having a total cation ratio of the calcium, cadmium and manganese components to the phosphate anion ratio in the range from 9.75/6 to 9.97/6. Understandably, over this range, it will become necessary to vary the firing conditions and batch formulations in a manner already known in the art to achieve the optimum final properties desired. It is intended to limit the present invention, therefore, only by the scope of the appended claims.

What is claimed as new and desired to be secured by Letters Patent of the U.S. is:

1. A process of reducing cadmium loss by emission during the manufacture of a calcium halophosphate phosphor having the general formula $$3\ Ca_3(PO_4)_2 \cdot CaX_2 : Mn, Sb$$

wherein a portion of the calcium ion has been replaced by cadmium ion, and X is a halogen ion including a mixture of fluorine and chlorine, said phosphor having a ratio of the total calcium, cadmium and manganese cations to phosphate anion of 9.75/6 to 9.97/6 which comprises firing a raw phosphor forming ingredient mixture devoid of a cadmium source comprising $CaHPO_4$, $CaCO_3$, $CaF_2$, $NH_4Cl$, $MnCO_3$ and $Sb_2O_3$ at a temperature of 1100°–1200°C, blending 0.5–7.1% by weight of a cadmium phosphate compound selected from the group consisting of cadmium pyrophosphate and cadmium ammonium phosphate into the fired mixture and then firing said fired mixture and cadmium phosphate compound at a temperature of 900°–1150°C in an inert atmosphere for a sufficient time to produce an efficient phosphor with a minimum loss of cadmium.

2. The process of claim 1 wherein said cation to phosphate anion ratio is approximately 9.86/6.

* * * * *